(12) United States Patent
Hauler

(10) Patent No.: US 6,325,461 B1
(45) Date of Patent: Dec. 4, 2001

(54) THEFT DETERRENT FULL-FACE WHEEL COVER

(75) Inventor: Gregory R. Hauler, Montague, MI (US)

(73) Assignee: Lacks Industries, Inc.

(*) Notice: Subject to any disclaimer, the term of this patent is extended or adjusted under 35 U.S.C. 154(b) by 0 days.

(21) Appl. No.: 09/522,024

(22) Filed: Mar. 9, 2000

(51) Int. Cl.$^7$ ................................. B60B 7/00; B60B 7/14
(52) U.S. Cl. .................. 301/37.1; 301/37.37; 301/37.42
(58) Field of Search ................................. 301/37.1, 37.21, 301/37.28, 37.31, 37.32, 37.33, 37.34, 37.37, 37.42

(56) References Cited

U.S. PATENT DOCUMENTS

| | | |
|---|---|---|
| 4,382,635 | 5/1983 | Brown et al. . |
| 4,707,035 | 11/1987 | Kondo et al. . |
| 4,842,339 | 6/1989 | Roulinson . |
| 4,844,551 | 7/1989 | Hempelmann . |
| 4,895,415 | 1/1990 | Stay et al. . |
| 4,998,780 | 3/1991 | Eshler et al. . |
| 5,071,197 | 12/1991 | Webster et al. . |
| 5,163,739 | 11/1992 | Stanlake . |
| 5,181,767 | 1/1993 | Hudgins et al. . |
| 5,249,845 | 10/1993 | Dubost . |
| 5,297,854 | 3/1994 | Nielsen et al. . |
| 5,364,172 | 11/1994 | Sopko et al. . |
| 5,520,445 | 5/1996 | Toth . |
| 5,595,422 | 1/1997 | Ladouceur . |
| 5,667,281 | 9/1997 | Ladouceur . |
| 5,752,794 * | 5/1998 | Krwczak ............................ 301/37.37 |
| 5,842,749 | 12/1998 | DiMarco . |
| 5,918,946 | 7/1999 | DiMarco . |
| 6,017,096 * | 1/2000 | Russell ............................. 301/37.37 |
| 6,022,081 * | 2/2000 | Hauler et al. ....................... 301/37.1 |
| 6,030,049 * | 2/2000 | Russell ............................. 301/37.37 |
| 6,039,406 * | 3/2000 | Sheu ................................. 301/37.37 |
| 6,070,947 * | 6/2000 | Hoyle, Jr. ......................... 301/37.37 |

* cited by examiner

*Primary Examiner*—S. Joseph Morano
*Assistant Examiner*—Jason R. Bellinger
(74) *Attorney, Agent, or Firm*—Vanophem & Vanophem, P.C.

(57) ABSTRACT

A wheel cover retention system includes a wheel having lug studs extending through the wheel, with lug nuts fastened to the lug studs to retain the wheel to the vehicle. A full-face wheel cover includes a base portion having an inboard surface thereon and lug nut passages extending therethrough, and further includes lug towers circumferentially spaced and integral with the base portion. Each of the lug towers is concentric with each of the lug nut passages and extends axially inwardly from the inboard surface of the base portion thereby terminating in an inboard end. Each lug tower is slotted to define cantilevered fingers thereon. A groove located inside each lug tower positively fixes the axial position of each of the lug towers on each of the lug nuts. Upon mounting the full-face wheel cover to the lug nuts, each of the cantilevered fingers is cantilevered radially outwards to respectively snap onto and over the flange of each of the lug nuts whereby the groove fixes the axial position of each of the lug towers to prevent overtravel of the cantilevered fingers during assembly of the full-face wheel cover to the lug nuts. The present invention also includes a method of manufacturing the wheel cover.

18 Claims, 3 Drawing Sheets

THEFT DETERRENT FULL-FACE WHEEL COVER

BACKGROUND OF THE INVENTION

1. Field of the Invention

The present invention generally relates to vehicle wheel covers with integral lug nut retention systems. More specifically, this invention relates to a theft deterrent full-face wheel cover that is snapped to the lug nuts of a wheel and is not removable without removing at least one lug nut.

2. Description of the Prior Art

Wheel covers have been used on vehicle wheels for many decades for purposes of aesthetic design, reduction in drag coefficient, and for improvement of brake cooling. Wheel covers have been fastened to wheels with a variety of devices including, clips, springs, and integral retaining features. In contrast, integral press-on wheel covers typically involve a cover body provided with integral tubular extensions or lug towers each having an integral projection for engaging a flange of a lug nut. With this particular style, the cover is integrally retained on the wheel by the cooperating interengagement of tubular extensions of the cover mounting to the lug nuts.

The tubular extensions are axially slotted to be divided into a plurality of cantilevered fingers, which cooperate with the lug nuts to retain the wheel cover thereto. The fingers of each tubular extension include integral radially extending abutments that resiliently engage within a radial recess of a respective lug nut to resiliently grip the lug nut and retain the cover thereto. Concurrent with receipt of the abutments in the radial recess, a tapered radial face on each finger engages an axially outwardly extending annular face of the lug nut in an attempt to provide a slight axial outward force on each finger to prevent axial shifting movement of the tubular extensions relative to the lug nuts.

The abutments describe a circle which is slightly less than the circle of the hexagonal portion of the lug nuts so that the fingers slightly separate or flex axially outwardly as the abutments move over the hexagonal portion of the lug nuts. Therefore, the fingers separate as the abutments move over a shoulder of the lug nuts until the abutments snap into the circumferential recess in each respective lug nut. When the abutments are received in the recess, the fingers return substantially to their normal molded shape.

One of several problems associated with this design is the adverse effects of tolerance stack ups between the axially outwardly extending annular face and the location of the recess on the lug nut. The fit of the cover to the lug nut depends on the depth and width of a recess that is on the lug nut and a tapered surface on the wheel face next to where the lug nut is seated. The tolerance build up among the radial tapered extension on the end of each finger of the cover, the lug nut, and the taper on the wheel's surface results in recess width variations that will prevent the radial tapered face of the abutment to move to the bottom of the recess, resulting in a loose fit on the lug nut, and a stress condition in the fingers of the retainer. Furthermore, such systems have several other drawbacks as described below.

For example, U.S. Pat. No. 4,707,035 to Kondo et al. teaches use of an integral press-on wheel cover for full-face wheel covering and not just half-face covering. Previously, only half size covers were used since there was no effective means for firmly locating the peripheral portion of the cover to the wheel. Accordingly, Kondo et al. disclose a wheel cover having a first fastening structure including cylindrical projections that are adapted to fit over and firmly grasp lug nuts of the wheel. The cylindrical projections are blind and do not include passages that extend through the face of the cover. Kondo et al. further discloses a second fastening structure including plate-like rim engaging projections that are adapted to snap into recesses in the rim for holding the periphery of the wheel cover against the wheel. Kondo et al. disclose that the second fastening structure is provided for preventing the rim engaging projections from being easily removed from the wheel. Regrettably, Kondo et al. thus has a very serious drawback.

Kondo et al. do not bother to disclose how the wheel cover is to be removed from the wheel. Since the cylindrical projections are blind and since there is no access to the lug nuts once the cover is fastened to the lug nuts, it would appear to be nearly impossible to remove the wheel cover without breaking it. One might attempt to pry the wheel cover off at the periphery with a tire iron, but would almost certainly fail to disengage both the periphery and the cylindrical projections without breaking the rim engaging projections or body of the wheel cover. Furthermore, there does not appear to be any way of removing the wheel cover at the lug nuts either, since access to the lug nuts is not provided with this design.

In another example, U.S. Pat. No. 5,163,739 to Stanlake, there is taught use of a full-face press-on wheel cover that requires a separate wire retainer. Stanlake discloses a wheel cover retention system having a wheel cover with open integral tubular extensions for attaching the wheel cover to lug nuts of a wheel. Each open tubular extension has flexible fingers for ratcheting over a flange on the lug nut and for gripping the flange. A wire retainer has rings encircling the fingers of each tubular extension for restricting removal of the wheel cover once assembled to the wheel. Unfortunately, this design requires use of a separate wire retainer to hold the cover to the wheel. Furthermore, there is no feature to limit overtravel of the cover as it is being applied to the wheel. Such overtravel can lead to fracture of the wheel cover, or rattling of the wheel cover due to inherent axial play.

Additionally, U.S. Pat. No. 5,595,422 to Ladouceur teaches a full-face press-on wheel cover having open integral tubular extensions. Ladouceur discloses a wheel cover having circumferentially spaced wells that grip lug nuts of a wheel and have integral cap portions for concealing the lug nuts of the wheel once the cover is assembled. Locking arms project axially from the wells to embrace the lug nuts to lock the cover securely to the wheel. Unfortunately, once the cover is assembled to the wheel, there is no way to remove the lug nuts since the integral cap portions block access thereto. Therefore, a separate anti-theft tool is required to release the locking arms from the lug nuts to remove the wheel cover.

Finally, U.S. Pat. No. 6,022,081 to Hauler et al. assigned to the assignee hereof teaches use of an ornamental wheel cover that is integrally retained on the lug nuts of a vehicle wheel and provides positive positioning of the cover to the lug nuts. The lug nuts preferably have a flange that defines an upper shoulder. The cover is provided with a number of elongated tubular extensions axially projecting from the cover that are each partially slotted to provide a plurality of cantilevered fingers. Each finger has a groove that has a shoulder, which positively positions the cover to the upper shoulder of the lug nuts of the wheel. Below the groove is a bulbous portion that contacts the lug nut below the flange. When the cover is attached to the wheel, the elongated tubular extensions are aligned with the lug nuts and the cover is moved axially inwardly of the wheel so that the cantilevered fingers separate slightly as the bulbous portions pass over the flange of the lug nut. The shoulder of the groove engages the upper shoulder of the lug nut flange, thereby providing a positive axial location of the cover to the wheel and eliminating the effects of misalignment of components due to tolerance stack ups. The bulbous portion passes over the flange of the lug nut and engages the underside of the flange, thereby retaining the cover on the lug nut. While the Hauler et al. patent No. 6,022,081 describes a simplified and novel approach to retain a wheel cover to a wheel, it does not address the problem of finding a simplified and novel way to retain a full-face wheel cover to a wheel so that the wheel cover is easily serviceable and removable.

Accordingly, what is needed is a full-face wheel cover having integral open tubular extensions that does not require use of a special tool to remove the wheel cover once assembled to the wheel, and also provides access to the lug nuts by an open well wrench for easy removal of the wheel cover. There is also a need for a wheel cover that provides positive axial positioning of the wheel cover relative to the wheel, thereby eliminating the effects of tolerance stack ups and the possibility of overtravel that result in poor fit of the cover to the wheel. There is also a need for a low-cost cover that attaches to the lug nuts with a fit that is independent of manufacturing tolerances outside of the physical dimensions of the nut itself, thereby eliminating the excessive variances that result from tolerance stack ups of several interrelated parts, i.e. the wheel cover, the lug nut, the wheel surface, and the interrelationship of all three items. Finally, there is a need for an integral one-piece wheel cover that does not require use of any separate retainers or fasteners.

SUMMARY OF THE INVENTION

According to the present invention there is provided a full-face wheel cover having integral open tubular extensions that does not require use of a special tool to remove the wheel cover once assembled to the wheel, and also provides access to the lug nuts by an open well wrench for easy removal of the wheel cover. Further provided is a wheel cover that provides positive axial positioning of the wheel cover relative to the wheel, thereby eliminating the effects of tolerance stack ups and the possibility of overtravel that result in poor fit of the wheel cover to the wheel. Also provided is a low-cost wheel cover that attaches to the lug nuts with a fit that is independent of manufacturing tolerances outside of the physical dimensions of the nut itself, thereby eliminating the excessive variances that result from tolerance stack ups of several interrelated parts, i.e. the wheel cover, the lug nut, the wheel surface, and the interrelationship of all three items. Finally, there is a provided an integral one-piece wheel cover that does not require use of any separate retainers or fasteners.

In one embodiment of the present invention, a full-face wheel cover is adapted to be mounted to a wheel having lug nuts. The full-face wheel cover includes a base portion having an inboard surface thereon and lug nut passages extending therethrough. Lug towers are circumferentially spaced and are integral with the base portion, such that each lug tower is concentric with each lug nut passage. Each lug tower extends axially inwardly from the inboard surface of the base portion and terminates in an inboard end. Each lug tower is slotted in the inboard end to define cantilevered fingers having an axial locating portion that defines an axial stop for the full-face wheel cover. Each cantilevered finger communicates with each lug nut to restrain the full-face wheel cover from removal from the lug nuts after the full-face wheel cover is installed against the wheel. As the full-face wheel cover is fitted over the lug nuts by respectively aligning each of the lug towers with each of the lug nuts, each of the cantilevered fingers passes respectively over each of the lug nuts thereby resulting in positive axial location of the full-face wheel cover with respect to the wheel.

In another embodiment of the present invention, a wheel cover retention system includes a wheel having lug studs extending through the wheel. Lug nuts are fastened to the lug studs to retain the wheel to the vehicle. A full-face wheel cover includes a base portion having an inboard surface thereon and lug nut passages extending therethrough. The full-face wheel cover further includes lug towers circumferentially spaced and integral with the base portion. Each tower is concentric with each lug nut passage and extends axially inwardly from the inboard surface of the base portion and terminates in an inboard end. Each lug tower is slotted to define cantilevered fingers thereon. The wheel cover retention system also includes a groove located inside each lug tower for positively fixing the axial position of each of the lug towers on each of the lug nuts. The groove is located inside each lug tower. Upon mounting the full-face wheel cover to the lug nuts, each of the cantilevered fingers is cantilevered radially outwards to respectively snap onto and over the shoulder of each of the lug nuts whereby the groove fixes the axial position of each of the lug towers to prevent overtravel of the cantilevered fingers during assembly of the full-face wheel cover to the lug nuts. The present invention also includes a method of manufacturing the wheel cover.

Accordingly, it is an object of the present invention to provide a wheel cover and wheel cover retention system that eliminates or mitigates at least one of the above-mentioned problems of the prior art.

It is another object to provide a full-face wheel cover that snaps integrally over lug nuts of a wheel, is retained tightly to the wheel without looseness or rattling, and is removable from the wheel by loosening and removing the lug nuts.

It is yet another object to provide a full-face wheel cover that does not require any separate fasteners or retainers to hold the cover to the wheel, and is serviceable and removable from the wheel.

It is still another object to provide a full-face wheel cover that includes a predefined amount of pre-load or drawdown from the periphery of the cover to the center of the cover that keeps the cover firmly in contact with the wheel at all times, even after the cover has incurred creep due to temperature increase.

It is a further object to provide a wheel cover that provides positive axial positioning of the wheel cover relative to the wheel, to eliminate the effects of tolerance stack ups and the possibility of overtravel that result in poor fit of the cover to the wheel.

It is yet a further object to provide a low-cost wheel cover that attaches to the lug nuts of a wheel with a fit that is independent of manufacturing tolerances outside of the physical dimensions of the nut itself, thereby eliminating excessive variances that result from tolerance stack ups of the cover, the lug nut, the wheel surface, and the interrelationship of all three.

It is still a further object to provide a wheel cover that is removable with the lug nuts of the wheel, yet is theft deterrent in that the cover will fail and break if one attempts to pry the cover off at the periphery, thus destroying the motive to steal the cover.

These objects and other features, aspects, and advantages of this invention will be more apparent after a reading of the following detailed description, appended claims, and accompanying drawings.

DETAILED DESCRIPTION OF THE PREFERRED EMBODIMENT

Figure 1:
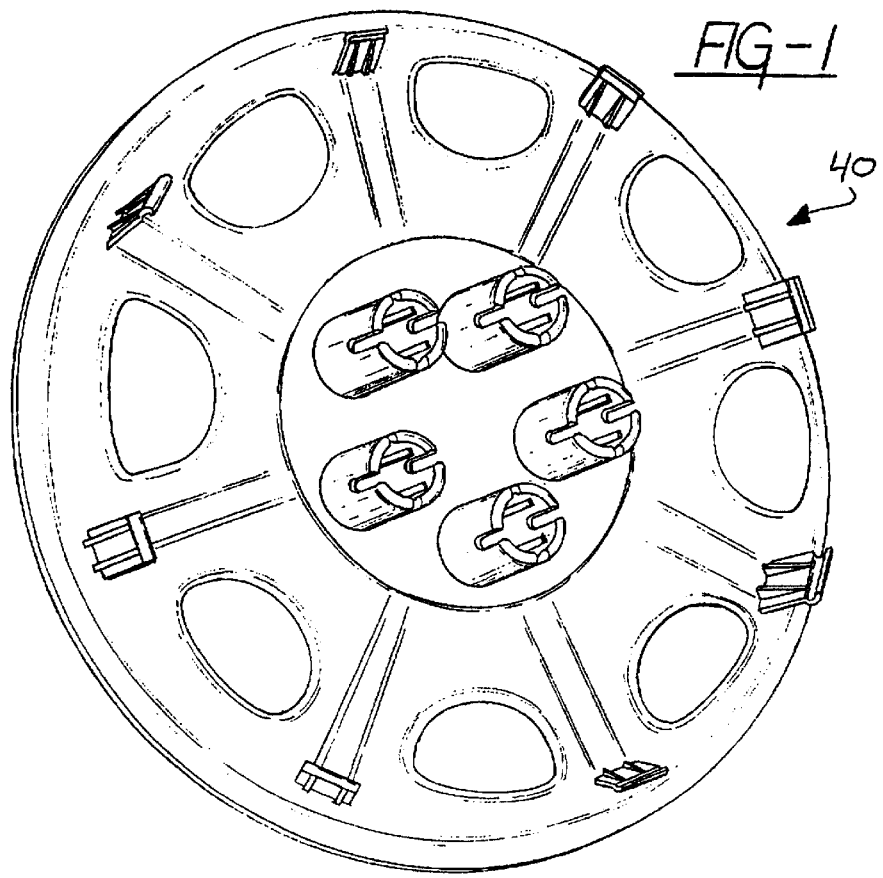
FIG. 1 is a perspective view of the rear of the wheel cover.
Figure 2:
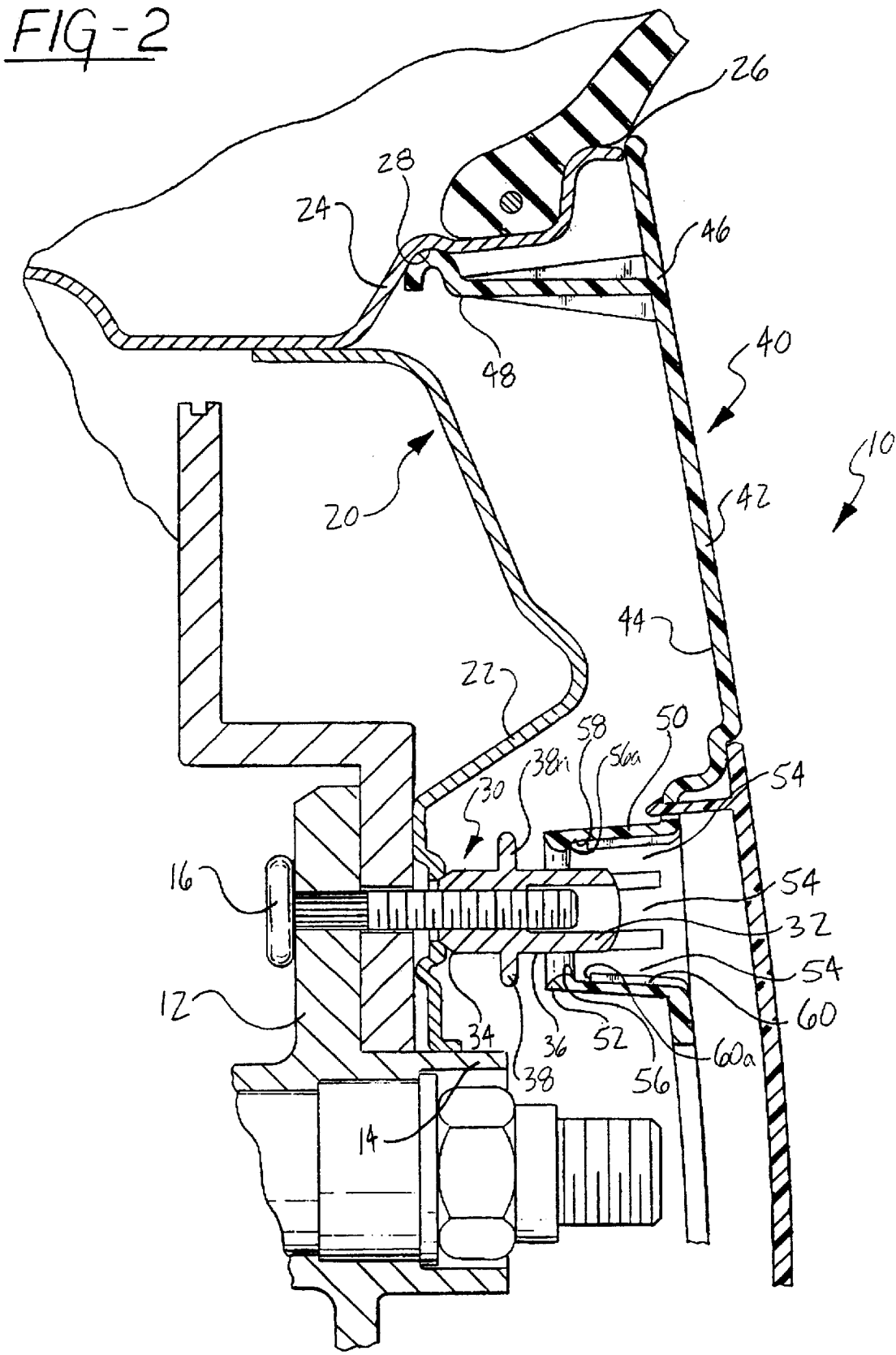
FIG. 2 is a cross-sectional view of a wheel assembly having a full-face wheel cover partially assembled to a wheel, according to the preferred embodiment of the present invention.

Referring to the figures, a wheel cover 40 according to the preferred embodiment of the present invention is shown in FIG. 1 As shown in FIG. 2, a wheel cover retention system 10 of the present invention is to be used on a wheel 20 that includes a rim 24 and wheel hub 22 having a typical hole pattern that receives lug studs 16 that extend laterally from a vehicle axle 12. The wheel 20 is mounted on an axle hub 14 and on the lug studs 16, and lug nuts 30 are secured on the lug studs 16 to retain the wheel 20 on the vehicle.

The lug nuts 30 include a hex head 32, and further includes an outer annular surface 36 extending between the hex head 32 and a wheel engaging surface 34. The outer annular surface 36 defines a flange 38 having a shoulder 38a. The lug nuts 30 of this design are equally adaptable to steel wheels and aluminum wheels. The conical seat on an aluminum wheel is deeper because more surface area contact between the wheel 20 and the lug nut 30 is required to achieve proper torque requirements. The lug nut design of the present invention will not affect the amount of surface area contact with the wheel, whether steel or aluminum, thereby allowing for adequate torque in either application. This feature is extremely efficient and cost effective for assembly purposes by allowing a standard lug nut to be used on one or more vehicles for all of the wheel designs applicable to a vehicle, whether steel or aluminum.

The wheel cover 40 of the present invention is a plastic part that can be injection molded. The wheel cover 40 has a base portion 42 and an inboard surface 44. A plurality of elongated tubular extensions or lug towers 50 axially protrude from the inboard surface 44 of the wheel cover 40. Each lug tower 50 extends from the base portion 42 axially inwardly and terminates in an inboard end 52. Each of the lug towers 50 are partially slotted to provide a plurality of cantilevered fingers 54. Each cantilevered finger 54 generally decreases in radial thickness going from the base portion 42 toward the inboard end 52.

FIG. 2 shows the wheel cover 40 placed against the wheel 20 where a peripheral portion 46 of the wheel cover 40 abuts a rim flange lip 26 of the wheel 20 and a foot 48 engages a recess 28 in the rim 24 of the wheel 20. The wheel cover 40 is aligned with the wheel 20 such that each lug tower 50 circumscribes each lug stud 16, and only the wheel cover peripheral portion 46 locates against the wheel rim 24 in an initial state of rest.

In the preferred embodiment, each cantilevered finger 54 is provided with a groove 58 that is defined by a shoulder 60a of an internal rib 60 and a bulbous portion 56 of each cantilevered finger 54. The internal rib 60 has the shoulder 60a at one end and the bulbous portion 56 has a tapered or contoured sidewall 56a at another end. The shoulder 60a is used to positively position the wheel cover 40 to the lug nuts 30 on the wheel 20 as will be hereinafter discussed. The shoulder 60a of the internal rib 60 will engage the shoulder 38a of the lug nut 30 on the annular flange 38 of the lug nut 30 providing a positive axial position of the wheel cover 40 to the wheel 20. The shoulder 60a prevents overtravel of the wheel cover 40 during assembly of the wheel cover 40 to the wheel 20 by acting as a positive axial stop against the shoulder 38a of the annular flange 38 of the lug nut 30. Adjacent the shoulder 60a is the groove 58 that will circumscribe the lug nut flange 38 and that terminates in the tapered sidewall 56a to form the bulbous portion 56 on the end of the cantilevered finger 54. The tapered sidewall 56a of the groove 58 contacts the lug nut 30 below the flange 38 to provide a retention force in order to keep the wheel cover 40 mounted to the wheel 20. The internal ribs 60 are provided along the center of each of the cantilevered fingers 54 along the inside of the lug tower 50. The internal ribs 60 add strength and durability to the cantilevered fingers 54, preventing them from becoming weak due to removal and replacement of the wheel cover 40.

Figure 4:
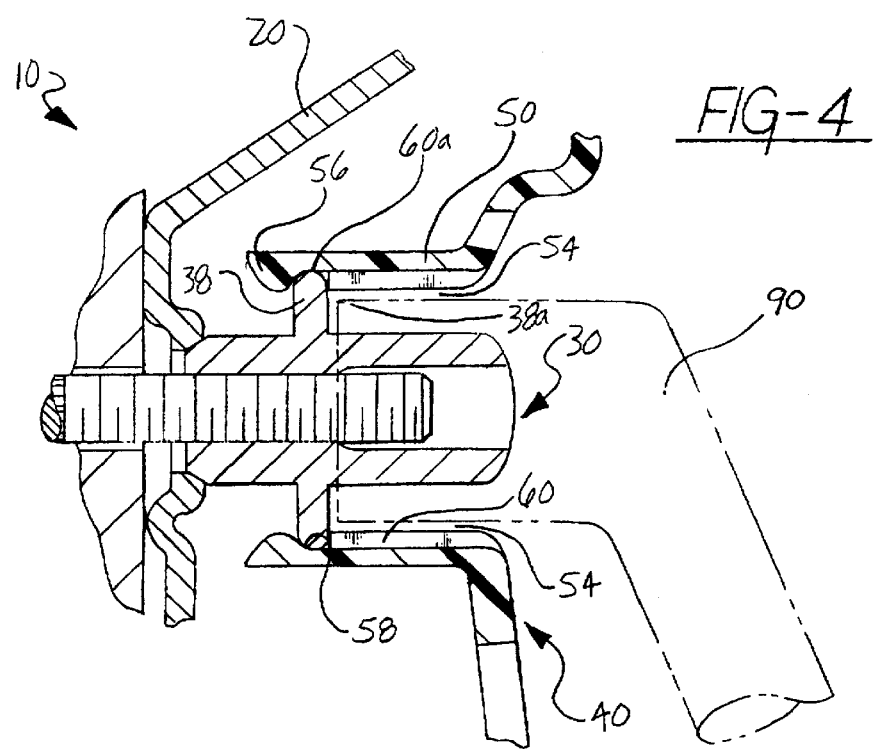
FIG. 4 is an enlarged view of the lug tower area of FIG. 3, as assembled to a lug nut.
Figure 3:
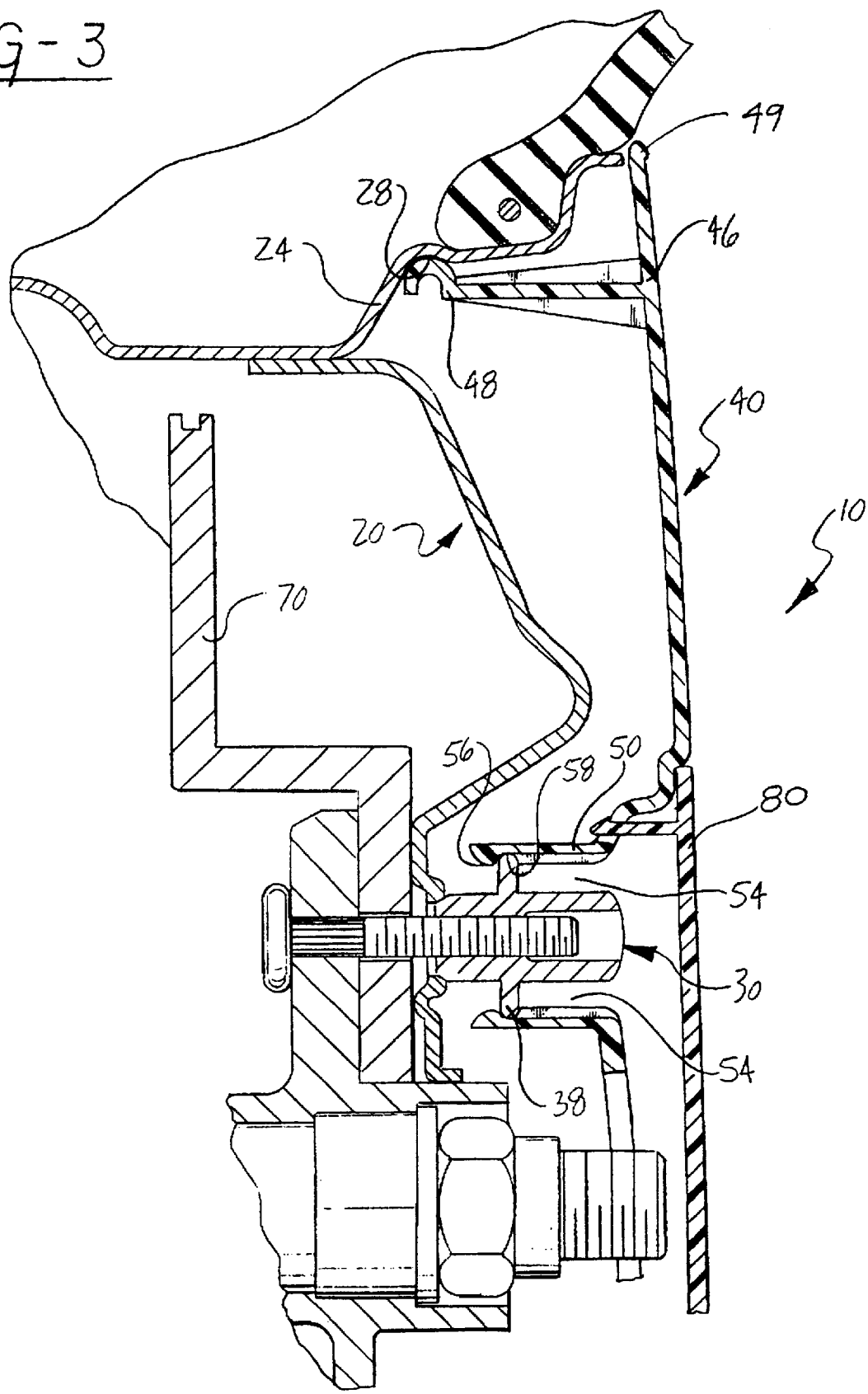
FIG. 3 is the wheel assembly of FIG. 2 showing the full-face wheel cover as completely assembled to the wheel.

The wheel cover 40 is pressed from its initial state of rest as depicted in FIG. 2 toward an inboard direction into engagement with the wheel 20, as shown in FIG. 3 and in greater detail in FIG. 4. The lug towers 50 are aligned with the lug nuts 30 and the wheel cover 40 is moved axially inwardly toward the wheel 20. The cantilevered fingers 54 separate slightly as the bulbous portion 56 passes over the lug nut flange 38. More specifically, the tapered or contoured sidewall 56a of the bulbous portion 56 engages the lower periphery of the flange 38. Therefore, the groove 58 snaps over the flange 38 thereby engaging the shoulder 60a of the internal rib 60 with the shoulder 38a of the lug nut flange 38, to retain the wheel cover 40 on the lug nuts 30. Similarly, and as shown in FIG. 3, the foot 48 maintains engagement with the recess 28 of the rim 24 of the wheel 20 to help keep the peripheral portion 46 of the wheel cover 40 firmly engaged with the rim 24 due to the spring back force in the wheel cover 40. A gap results between the flange lip 26 of the wheel and an outer flange 49 of the wheel cover 40.

Referring again to both FIGS. 3 and 4, the end of the lug tower 50 is spaced a predetermined distance from the wheel 20 itself to ensure that the wheel cover 40 cannot be forced into the wheel 20. This predetermined distance is controlled by the positive location of the lug nut flange shoulder 38a, with respect to the internal rib shoulder 60a, thereby eliminating the potential for overtravel of the cantilevered fingers 54.

Referring only to FIG. 3, the displacement of the wheel cover 40 toward the wheel 20 from the initial state of rest is defined as the drawdown on the wheel cover 40. The drawdown is a measure of how much the wheel cover 40 is drawn inboard toward the wheel 20 as the wheel cover 40 is snapped in place to the lug nuts 30 to draw the peripheral portion 46 of the wheel cover 40 down against the wheel 20. Drawdown ensures positive axial engagement of the wheel cover peripheral portion 46 to the wheel 20 at all times, by imparting a spring-like pre-load across the wheel cover 40. The wheel cover 40 requires drawdown to be induced during assembly to compensate for outward displacement of the wheel cover 40. The outward displacement of the wheel cover 40 is due to thermal axial growth of the lug towers 50 stemming from heat transfer from a brake disc 70. Typical outward displacement of a plastic wheel cover 40 due to thermal expansion is on the order of 3 mm. Therefore, the amount of drawdown induced is engineered to be about 5 mm, leaving a safety dimension of 2 mm.

Once the wheel cover 40 has been drawn down to the wheel 20, the wheel cover 40 may be removed with only two steps. First, a snap-in ornament 80 must be removed as is commonly known in the art. Second, each lug nut 30 must be removed by reversing the rotation of the lug nut 30 with a tire iron 90 or other tool (as shown in FIG. 4). Reversing each lug nut 30 will inherently pull the center of the wheel cover 40 away from the wheel 20 and will also pull the foot 48 out of the recess 28 to disengage the peripheral portion 46 of the wheel cover 40 from the wheel 20. Alternatively, the wheel cover 40 of the present invention need not include the snap-in ornament 80 and instead may be structured such that the lug nuts 30 are exposed.

From the above, it can be appreciated that a significant advantage of the present invention is that sufficient drawdown eliminates looseness and rattling of the wheel cover by keeping the wheel cover firmly located against the wheel.

Another advantage is that the wheel retention system of the present invention provides a theft deterrent feature since it will be nearly impossible to remove the wheel cover by prying it off at the peripheral portion. Prying at the peripheral portion, will instead tend to fracture the wheel cover around the body portion thus eliminating the motive to steal the wheel cover. However, for one who has more time and patience than a would-be thief, the wheel cover may be removed with only two steps.

Yet another advantage is that the integral retention system of the present invention provides positive location of the wheel cover relative to the lug nuts and the wheel. Lateral standoffs or shoulders define a groove that acts as a bilateral stop against the lug nut flange. As discussed above, if the wheel cover is allowed to overtravel, forces applied to the lug towers would press the cantilevered fingers against the wheel and force them apart, resulting in a loose fit of the wheel cover to the wheel. The groove of the wheel cover retention system of the present invention eliminates the overtravel problem. Therefore, because of the positive positioning, the wheel cover does not contact the wheel and cannot overtravel and the fit is more consistent over prior art retention systems that contact the surface of the wheel.

Still another advantage is that the fit of the wheel cover to the wheel is not dependent upon the dimensions and location of a groove in the lug nut as in prior art retention systems. The amount of surface area contact, whether with an aluminum or a steel wheel, between the lug nut of the present invention and the wheel is unaffected by the design of the lug nut. There is no groove beneath the annular surface that would prevent surface area contact with the wheel thereby allowing the wheel cover of the present invention to be used with a steel wheel as well as an aluminum wheel. The wheel cover retention system disclosed in general in the prior art which requires a grooved lug nut, cannot be used on an aluminum wheel without adversely affecting the torque because the groove results in less surface area contact with an aluminum wheel where more is required. In other words, the lug nut can be used equally as well in both steel and aluminum wheel applications, and the groove arrangement on the wheel cover eliminates the need for any groove on the lug nut. The interface between the shoulder of the groove and the lug nut flange eliminates the problems of prior art retention systems caused by tolerance stack ups.

It is to be understood that the detailed description and drawings of the present invention do not describe the only embodiment of the present invention, and in fact various modifications are obtainable without departing from the scope of the present invention. Accordingly, the scope of the invention is to be limited only by the claims appended hereto.

What is claimed is:

1. A full-face wheel cover adapted to be mounted to a wheel having a plurality of lug nuts, said full-face wheel cover comprising:

a base portion including an inboard surface thereon and a plurality of lug nut passages extending therethrough; and a plurality of lug towers circumferentially spaced and integral with said base portion, each of said plurality of lug towers being concentric with each of said plurality of lug nut passages and extending axially inwardly from said inboard surface of said base portion and terminating in an inboard end, each of said plurality of lug towers being slotted in said inboard end to define a plurality of cantilevered fingers on each of said plurality of lug towers, each of said plurality of cantilevered fingers having means for positively locating said full-face wheel cover with respect to said wheel in an axial direction, each of said plurality of cantilevered fingers communicating with each of said plurality of lug nuts to restrain said full-face wheel cover from removal from said plurality of lug nuts after said full-face wheel cover is installed against said wheel;

whereby as said full-face wheel cover is fitted over said plurality of lug nuts by respectively aligning each of said plurality of lug towers with each of said plurality of lug nuts, each of said plurality of cantilevered fingers passes respectively over each of said plurality of lug nuts and said means for positively locating said full-face wheel cover establishes the axial position of each of said plurality of lug towers to prevent overtravel of said plurality of cantilevered fingers during assembly of said full-face wheel cover to said plurality of lug nuts, resulting in positive axial location of said full-face wheel cover with respect to said wheel.

2. The full-face wheel cover as claimed in claim 1, wherein each of said plurality of lug nuts has a flange thereon.

3. The full-face wheel cover as claimed in claim 2, wherein said means for positively locating said full-face wheel cover to said wheel comprises:

a groove located inside each of said plurality of lug towers on each of said plurality of cantilevered fingers located axially outboard from said inboard end; and at least one rib located inside each of said plurality of lug towers on each of said plurality of cantilevered fingers axially outboard of said groove;

whereby said at least one rib communicates with said flange to positively fix the axial position of said full-face wheel cover relative to said wheel.

4. The full-face wheel cover as claimed in claim 3, wherein each of said plurality of cantilevered fingers includes a bulbous end portion at said inboard end, said bulbous end portion having a contoured surface thereon, said contoured surface communicating with said flange of each of said plurality of lug nuts, whereby said bulbous end portion passes respectively over said flange and said flange snaps into said groove.

5. The full-face wheel cover as claimed in claim 4, wherein said contoured surface is arcuate.

6. The full-face wheel cover as claimed in claim 4, wherein said contoured surface is tapered.

7. The full-face wheel cover as claimed in claim 1, wherein the thickness of each of said plurality of cantilevered fingers decreases from said base portion toward said inboard end.

8. The full-face wheel cover as claimed in claim 1, wherein said base portion further includes a peripheral portion therearound, whereby as said wheel cover is assembled to said wheel, said peripheral portion contacts said wheel in an initial state of rest, then said wheel cover is drawn down toward said plurality of lug nuts such that said wheel cover flexes inwardly, then each of said plurality of lug towers is snapped respectively to each of said plurality of lug nuts, such that said peripheral portion of said wheel cover is inherently spring-loaded against said wheel to prevent said wheel cover from loosening and rattling against said wheel.

9. The full-face wheel cover as claimed in claim 8, wherein said wheel includes a rim having a recess portion therein, said peripheral portion of said wheel cover further includes a foot portion extending radially inboard from said inboard surface of said wheel cover, wherein said foot portion snaps into engagement with said recess portion to further retain said full-face wheel cover to said wheel.

10. A wheel cover retention system for a vehicle, said wheel cover retention system comprising:

a wheel;

a plurality of lug studs extending through said wheel;

a plurality of lug nuts fastened to said plurality of lug studs to retain said wheel to said vehicle, each of said plurality of lug nuts having a flange thereon; and a full-face wheel cover, said full-face wheel cover further comprising:

a base portion having an inboard surface thereon and a plurality of lug nut passages extending therethrough;

a plurality of lug towers circumferentially spaced and integral with said base portion, each of said plurality of lug towers being concentric with each of said plurality of lug nut passages and extending axially inwardly from said inboard surface of said base portion and terminating in an inboard end, each of said plurality of lug towers being slotted to define a plurality of cantilevered fingers thereon; and means for positively locating said full-face wheel cover with respect to said wheel in an axial direction;

such that upon mounting of said full-face wheel cover to said plurality of lug nuts, each of said plurality of cantilevered fingers is cantilevered radially outwards to respectively snap onto and over said flange of each of said plurality of lug nuts whereby said means for positively locating said full-face wheel cover to said wheel establishes the axial position of each of said plurality of lug towers to prevent overtravel of said plurality of cantilevered fingers during assembly of said full-face wheel cover to said plurality of lug nuts.

11. The wheel cover retention system as claimed in claim 10, wherein said means for positively locating said full-face wheel cover to said wheel comprises:

a groove located inside each of said plurality of lug towers on each of said plurality of cantilevered fingers; and at least one rib located inside each of said plurality of lug towers on each of said plurality of cantilevered fingers located axially outboard of said groove;

whereby said at least one rib communicates with said flange of each of said plurality of lug nuts to positively fix the axial position of said full-face wheel cover relative to said wheel.

12. The wheel cover retention system as claimed in claim 11, wherein each of said plurality of cantilevered fingers includes a bulbous end portion at said inboard end of each of said plurality of lug towers, said bulbous end portion having a contoured surface thereon, said contoured surface communicating with said flange of each of said plurality of lug nuts, whereby said bulbous end portion passes respectively over said flange and said flange snaps into said groove.

13. The wheel cover retention system as claimed in claim 12, wherein said contoured surface is arcuate.

14. The wheel cover retention system as claimed in claim 12, wherein said contoured surface is tapered.

15. The wheel cover retention system as claimed in claim 10, wherein the thickness of each of said plurality of cantilevered fingers decreases from said base portion toward said inboard end.

16. The wheel cover retention system as claimed in claim 10, wherein said base portion further includes a peripheral portion therearound, whereby as said full-face wheel cover is assembled to said wheel, said peripheral portion contacts said wheel initially, then said full-face wheel cover is drawn down toward said plurality of lug nuts such that said full-face wheel cover flexes inwardly, then each of said plurality of lug towers is snapped respectively to each of said plurality of lug nuts, such that said peripheral portion of said full-face wheel cover is inherently spring-loaded against said wheel to prevent said full-face wheel cover from loosening and rattling against said wheel.

17. The wheel cover retention system as claimed in claim 16, wherein said wheel includes a rim having a recess portion therein, said peripheral portion of said full-face wheel cover further includes a foot portion extending radially inboard from said inboard surface of said full-face wheel cover, wherein said foot portion snaps into engagement with said recess portion to further retain said full-face wheel cover to said wheel.

18. A method of manufacturing a full-face wheel cover adapted to be mounted to a plurality of lug nuts of a wheel, said method comprising the steps of:

providing a base portion including a plurality of lug nut passages therethrough, and a plurality of lug towers integral with said base portion, concentric with said plurality of lug nut passages, and extending axially inwardly from said base portion and terminating in an inboard end, said plurality of lug towers being slotted in said inboard end to define a plurality of cantilevered fingers thereon;

providing a groove on each of said plurality of lug towers near said inboard end of each of said plurality of cantilevered fingers; and placing at least one rib inside each of said plurality of lug towers between said inboard end and said base portion, whereby as said full-face wheel cover is mounted to said wheel said at least one rib provides a positive axial stop for said full-face wheel cover, and further whereby said at least one rib establishes the axial position of each of said plurality of lug towers to prevent overtravel of said plurality of cantilevered fingers during assembly of said full-face wheel cover to said plurality of lug nuts.

* * * * *

UNITED STATES PATENT AND TRADEMARK OFFICE
CERTIFICATE OF CORRECTION

PATENT NO.      : 6,325,461 B1
DATED           : December 4, 2001
INVENTOR(S)     : Hauler It is certified that error appears in the above-identified patent and that said Letters Patent is hereby corrected as shown below:

Column 1,
Line 17, after "including", delete the comma ",".

Column 3,
Line 9, after "patent" insert a comma -- , --.
Line 9, delete "No. 6,022,081".
Line 51, before "provided" delete the "a".

Column 5,
Line 21, after "FIG.1", insert a period -- , --.

Column 7,
Line 24, after "portion", insert a comma -- , --.
Line 26, after "portion", insert a comma -- , --.

Signed and Sealed this

Fourth Day of March, 2003

Attest:

Attesting Officer

JAMES E. ROGAN
Director of the United States Patent and Trademark Office